United States Patent [19]

Niva

[11] Patent Number: 4,522,549
[45] Date of Patent: Jun. 11, 1985

[54] TRANSPORT VEHICLE FOR A SLAG RECEPTACLE

[75] Inventor: Karl-Erik Niva, Kiruna, Sweden
[73] Assignee: Kiruna Truck AB, Kiruna, Sweden
[21] Appl. No.: 485,097
[22] Filed: Apr. 14, 1983

[30] Foreign Application Priority Data

Apr. 16, 1982 [SE] Sweden ............................ 8202397

[51] Int. Cl.³ .............................................. B60P 1/64
[52] U.S. Cl. ...................................... 414/474; 414/420;
414/421; 414/486; 414/498; 414/546; 296/35.3;
280/43.24
[58] Field of Search ............... 414/420, 421, 546, 474,
414/486, 498; 296/35.2, 35.3, 179; 212/189;
280/43.24

[56] References Cited

U.S. PATENT DOCUMENTS

| 2,806,710 | 9/1957 | Mascaro | 280/43.24 |
|---|---|---|---|
| 3,499,561 | 3/1970 | Beckwith | 414/420 |
| 3,520,429 | 7/1970 | Andersson | 414/421 |
| 4,013,184 | 3/1977 | Lacy | 414/546 X |
| 4,213,726 | 7/1980 | Robnett et al. | 414/420 |
| 4,390,314 | 6/1983 | Oberg | 280/43.24 X |

FOREIGN PATENT DOCUMENTS

| 2905299 | 8/1980 | Fed. Rep. of Germany . | |
|---|---|---|---|
| 1572737 | 6/1969 | France . | |
| 2078491 | 10/1971 | France . | |
| 2456003 | 12/1980 | France . | |
| 345102 | 5/1972 | Sweden . | |
| 1002635 | 8/1965 | United Kingdom | 414/546 |

Primary Examiner—Robert J. Spar
Assistant Examiner—Ken Muncy
Attorney, Agent, or Firm—Jones, Tullar & Cooper

[57] ABSTRACT

A transport vehicle for a slag pot comprising a vertically movable load surface and two lifting arms for the pot activated by hydraulic cylinders. The lifting arms are connected to a subframe positioned outside the load surface. The lifting arms are connected to the subframe immediately above ground support members. The subframe is pivotally connected to the forward portion of the load surface and rests on the rear portion of the load surface so that when the load surface is lowered, the ground support members are firmly placed against the ground.

14 Claims, 7 Drawing Figures

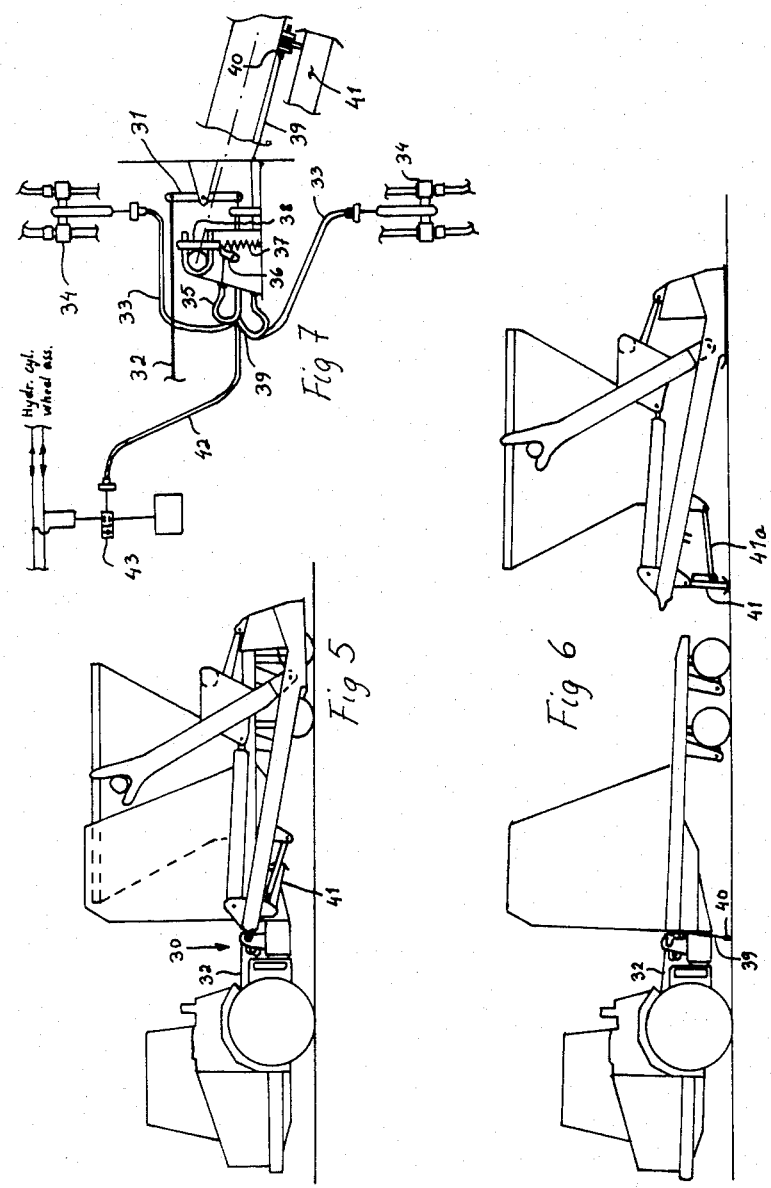

TRANSPORT VEHICLE FOR A SLAG RECEPTACLE

BACKGROUND OF THE INVENTION

The present invention relates to a transport vehicle for a slag receptacle, which contains liquid slag which is to be transported and dumped. The transport vehicle is towed by a conventional power unit providing an articulated unit.

Such transport units exist in several different versions. Normally, the lifting arms of such a unit are directly connected to the back portion of the load platform. Such a connection results in the fact that the lifting arms must be pivoted over a comparatively large pivoting angle over more than 115° at the lifting movement. Thus, the connection point of the hydraulic cylinder to the lifting arm must be positioned rather close to the pivot axis of the lifting arm, which means that big and powerful hydraulic cylinders must be used.

There are also transport vehicles having U-frames, wherein the U-frame is positioned embracing the slag receptacle. Such transport vehicles have advantages in certain applications but have e.g. the drawback that the rear wheels cannot be distributed over the full width of the vehicle but must be positioned at each side only.

SUMMARY OF THE INVENTION

The object of the present invention is to provide a transport vehicle for transporting a slag receptacle wherein the rear wheels are distributed over the whole width of the vehicle.

Another object of the invention is to provide a transport vehicle wherein the rear wheels are protected at the loading and unloading position in order to avoid that molten slag can reach the rear wheels and cause damage.

Accordingly the invention provides a transport vehicle for a slag receptacle or the like, comprising a load surface and two hydraulically powered lifting arms for the slag receptacle, which are pivotally connected to a subframe and are pivotable from a rear position for engagement with a slag receptacle positioned behind the vehicle and upwards and forwards for lifting of the receptacle up to the load surface. According to the invention the subframe is positioned outside the load surface and is pivotally connected to the load surface at its forward end whereby the rear portion of the subframe is supported by the rear portion of the load surface. The load surface is movable in a vertical direction in order to place, at lowering, ground support members of the subframe against the ground.

In order to prevent damage to the rear wheels by accidentially spilled molten slag, the subframe is provided with a protection cap which, in the lowered position, prevents molten slag from reaching the rear wheels.

The transport vehicle according to the invention is also provided with a safety mechanism which when operated releases the subframe from the transport vehicle.

The transport vehicle according to the invention has many inherent advantages compared to known constructions.

The pivot axis of the loading arms are, at loading, positioned very close to the ground, which means that the pivoted movement of the lifting arms can be restricted to no more than 90°. Thus, a more advantageous torque arm for the hydraulic cylinders is obtained. Thus, the hydraulic cylinders can be made smaller.

The weight at loading and unloading will be concentrated to the subframe, which at this condition stands directly on the ground by means of the ground support members. The load surface must only be designed for carrying the slag receptacle at transport thereof, which renders a simple construction.

BRIEF DESCRIPTION OF THE DRAWINGS

A preferred embodiment of the invention will be described in detail below by reference to the appended drawings, wherein:

FIG. 5 is a side view of the transport vehicle of FIG. 1 provided with a safety mechanism;

FIG. 6 is a side view of the transport vehicle of FIG. 5 with the safety mechanism released; and FIG. 7 is a schematic side view of the safety mechanism according to FIGS. 5 and 6 in an enlarged scale.

DESCRIPTION OF PREFERRED EMBODIMENTS

Figure 1:
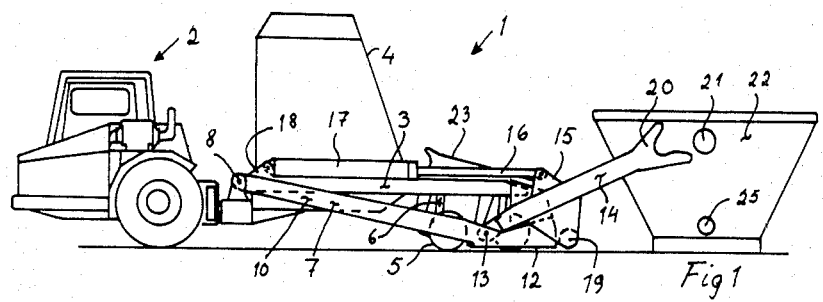
FIG. 1 is a side view of the transport vehicle according to the invention in a position for loading a slag receptacle.
Figure 2:
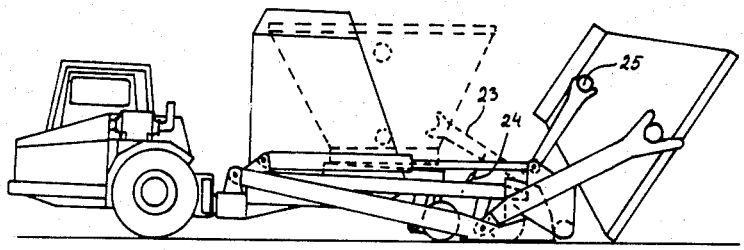
FIG. 2 is a side view similar to FIG. 1 with the transport vehicle in a position for dumping the slag in the slag receptacle.
Figure 3:
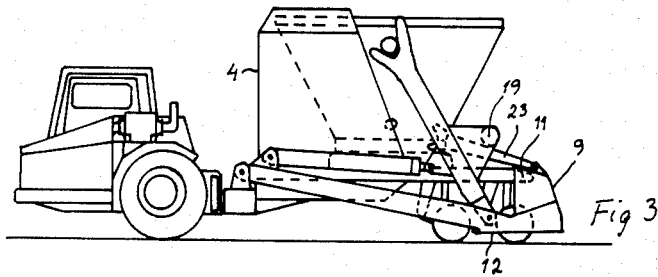
FIG. 3 is a side view similar to FIG. 1 with the slag receptacle loaded to the transport vehicle.

The transport vehicle 1 according to the invention is shown in FIGS. 1 to 3 in side view. The transport vehicle is towed by a power unit 2, such that an articulated vehicle is provided, compare FIG. 4. The transport vehicle comprises a load surface 3 having a protection shield 4. The load surface 3 is at its rear end supported by a wheel battery 5 and is vertically movable by means of hydraulic cylinders, one of which is shown at reference No. 6.

A subframe 7 is, at its forward end, connected to the load surface 3 by means of a pivot pin 8. The rear portion of the subframe 7 is shaped as a protection cap 9, which connects the two longitudinal subframe beams 10, whereby the subframe is essentially U-shaped and surrounds the load surface 3 on three sides. The protection cap 9 extends a short distance inside and above the rear rim 11 of the load surface, so that said rim supports the rear portion of the subframe. When the load surface 3 is sunk by means of the hydraulic cylinders 6, the subframe will be placed against the ground by means of ground support members 12 positioned on each sub frame beam 10 as more clearly appears from FIG. 2.

Immediately above the ground support members, a lifting arm 14 is connected at reference No. 13 to the sub frame beam 10. The lifting arm includes a lug 15, at which the piston rod 16 of a powerful hydraulic cylinder 17 is pivotally connected. The other end of the hydraulic cylinder is connected to a lug 18 at the forward portion of the subframe. By operating the hydraulic cylinder 17, the lifting arm 14 is pivoted over an arc between the two positions shown in FIGS. 1 and 3, which corresponds to an arc of about 90°.

The lifting arms 14 are at both sides of the transport vehicle connected with each other by means of a torsion rod 19 (compare FIG. 3), so that they always move in unison. At the outer end of each lifting arm there is a grabbing fork or yaw 20 for engagement with the lifting axis 21 of the pot 22, as is conventional.

The transport vehicle according to the invention is operated according to the following. When a pot standing on the ground is to be fetched, the lifting arms 14 are firstly folded backwards and the load surface 3 is sunk to the intermediate position shown in FIG. 1, so that the ground support members 12 of the subframe are positioned about 1 dm above the ground surface. Thereafter the transport vehicle is backed against the pot and the height position of the lifting arms is adjusted by raising and lowering the load surface until the yaws 20 grip about the lifting axis 21 of the pot 22.

After this, the load surface 3 is lowered to its lowermost position whereby the ground support members 12 are firmly placed against the ground. The hydraulic cylinders 17 are activated and retract the piston rods 16, whereupon the lifting arms lift the pot over an arc to the position shown in broken lines in FIG. 2, whereby the pot is positioned immediately above the supporting surface or plane of the load surface. Thereafter, the load surface 3 is raised by means of the hydraulic cylinders 6, and after a raising of about 1 dm, the load surface takes over the pot from the lifting arms, whereupon the rear rim 11 of the load surface lifts the subframe 7 from the ground to the transport position shown in FIG. 3.

When the pot is to be dumped, the load surface is firstly lowered so that the ground support members are firmly placed against the ground and the pot is again taken over by the lifting arms 14. Thereafter, two helper arms 23 are activated by means of pneumatic cylinders 24, whereupon the helper arms are lifted from their rest position to the operating position shown in broken lines in FIG. 2. When the pot by means of the lifting arms and the hydraulic cylinders 17 is moved backwards, the helper arms engage the tilting axes 25 of the pot, whereby the continued movement of the lifting arms entails that the pot is tilted to the dumping position shown in FIG. 2. By means of the protection cap 9 got slag is prevented from entering below the load surface and destroying the wheels and the like. After the dumping, the pot is moved back to the rest position shown in broken lines in FIG. 2.

Figure 4:
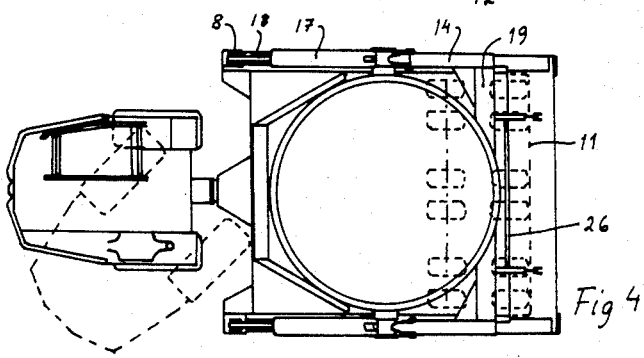
FIG. 4 is a plan view of the transport vehicle according to FIG. 1.

As appears from FIG. 4 the helper arms 23 are pivotally connectec to the protection cap and are connected to each other by means of a torsion rod 26 for movement in unison. The pneumatic cylinders 24 can of course also be hydraulic cylinders.

Due to the fact that the pivoting axes 13 of the lifting arms 14 are positioned very low and immediately above the ground support members 12, the advantage is achieved that the lifting arms only need to be pivoted over an arc of about 90° at loading and unloading. Thus, a longer torque arm can be used between the axis 13 and the lug 15, which makes it possible to use a smaller hydraulic cylinder 17 compared to the case where an arc of about 115° is used. This entails an considerable economic advantage.

Moreover, since the forces from the lifting arms are guided from the pivot axes 13 to the ground support members 12 and directly to the ground, the advantage of less strain in the construction details is achieved. The subframe is dimensioned for the forces occurring at loading and unloading while the load surface merely needs to be dimensioned for the forces occurring during the transport.

The transport vehicle according to the invention can easily be provided with a safety mechanism which disconnects the subframe in the event of danger, e.g. if a fire should occur or the slag pot should crack and hot slag should flow out.

In FIG. 5 the safety mechanism is shown at 30 and an enlargement thereof is shown in FIG. 7. At an emergency situation the operator actuates a hand lever positioned in the cabin. The hand lever is mechanically coupled to a lever 31 by means of a wire 32. At actuation, the lever 31 is pivoted clockwise in FIG. 7 and operates four different wires for performing four different operations. The first wire 33 disconnects quick release couplings 34 to the hydraulic cylinders of the lifting arms. The second wire 35 operates a pawl 36, whereby a spring 37 moves a locking pin 38 downwards for releasing the subframe from the transport vehicle or the load surface The third wire 39 operates a locking pin 40 in order to make free a support leg 41, which by gravity is folded down. A lever 41a locks the leg 41 in a vertical position. The fourth wire 42 places a valve 43 in an opened position in order to empty the hydraulic system for the rear wheel assembly whereby the rear end of the subframe is lowered.

After the above described operations, the subframe stands on the ground with the slag pot hanging in the lifting arms thereof. Thus, the transport vehicle is free from the subframe and can be driven to a safer area.

The described safety system is a mechanical system, operated by the driver in an emergency situation. However, the system can be made automatically operated and can also be implemented with hydraulic means. In the above specification, a preferred embodiment of the invention has been described. However, for a skilled person many modifications are obvious, and the invention is contemplated to encompass all such amendments and modifications. The invention is only limited by the appended claims.

I claim:

1. A transport vehicle for a slag receptacle, comprising
an essentially rectangular load surface having a forward end for connection to a towing vehicle and a rearward end;
a wheel assembly mounted at the rearward end of said load surface and supporting said load surface on the ground;
a subframe comprising two longitudinally extending side beams, each having a first and a second end and a transversely extending cross-beam interconnecting said first ends of said two side beams, said subframe surrounding said load surface at three sides thereof, so that said cross-beam extends across the rearward end of said load surface, said second ends of said two side beams being connected to a front portion of said load surface;
two lifting arms adapted for engagement with a receptacle positioned behind the transport vehicle for lifting a receptacle upwardly and forwardly to said load surface and for lifting a receptacle upwardly and rearwardly to remove it from said load surface, each of said lifting arms being pivotally connected to said subframe at positions adjacent said first ends of said side beams;
at least two hydraulic lifting cylinders for powering said two lifting arms, said lifting cylinders being pivotally connected to and supported by said side beams and pivotally engaging said lifting arms for moving said lifting arms and thereby lifting a receptacle;

depending ground-engaging means connected to said cross-beam;

means for lowering said depending ground-engaging means to abut the ground for lifting of a receptacle and for raising said ground engaging means off the ground for transporting a receptacle.

2. A transport vehicle according to claim 1, further including a protection cap mounted on said cross-beam for preventing slag from entering beneath said vehicle to thereby protect said wheel assembly.

3. A transport vehicle according to claim 1, wherein said second ends of said side beams are pivotally mounted on said load surface.

4. A transport vehicle according to claim 3, wherein said means for lowering and raising said ground-engaging means includes means for adjusting the height of the rearward end of said load surface.

5. A transport vehicle according to claim 4, wherein said cross-beam includes engagement means engaging the top of the rearward end of said load surface, whereby height adjustments of said rearward end of said load platform raise and lower said cross-beam to thereby raise and lower said first ends of said side beams, and said ground-engaging means connected thereto.

6. A transport vehicle according to claim 5, further including a protection cap mounted on said cross beam for preventing slag from entering beneath said vehicle, to thereby protect said wheel assembly.

7. A transport vehicle according to claim 5, wherein said engagement means is a horizontally and transversely extending portion of said cross-beam, said portion extending forwardly and above said rearward end of said load surface in order to rest on said load surface, and being free to move upwardly away from said load surface when said load surface is lowered.

8. A transport vehicle according to claim 5, wherein said means for lowering and raising said ground-engaging means includes means for moving said wheel assembly vertically to raise and lower said rearward end of said load surface, said depending ground-engaging means being lowered toward the ground by the lowering of said load surface.

9. A transport vehicle for a receptacle, comprising:

an essentially rectangular load surface having a forward end for engagement with a towing vehicle and a rearward end;

a wheel assembly mounted at said rearward end of said load surface;

a subframe having two longitudinal side beams and a transverse cross-beam interconnecting said two side beams at first ends thereof, said subframe surrounding said load surface at three sides thereof, so that said cross-beam extends across the rearward end of said load surface;

means pivotally connecting second ends of said side beams to a front portion of said load surface;

two lifting arms for engagement with a receptacle positioned behind the vehicle, each said lifting arm being pivotally connected to said subframe at a position adjacent a first end of a corresponding side beam for lifting a receptacle and moving it with respect to said load platform;

at least two hydraulic lifting cylinders for powering said lifting arms, said cylinders being supported by and pivotally connected to corresponding side beams and pivotally engaging corresponding lifting arms for moving said lifting arms through an arc to lift a receptacle;

depending means on said cross-beam; and means for lowering said depending means to the ground to protect said wheel assembly during lifting of a receptacle.

10. A transport vehicle according to claim 9, wherein said means for lowering said depending means comprises means for vertically moving said wheel assembly with respect to said load surface to raise and lower said rearward end of said load surface.

11. A transport vehicle according to claim 10, further including engagement means on said cross-beam for engaging said rearward end of said load surface, so that upon lowering of said rearward end of said load platform said depending means is lowered to abut the ground.

12. A transport vehicle according to claim 11, further including a safety mechanism comprising:

means for uncoupling said hydraulic cylinders from their power source;

a normally stored support leg for the front portion of said support frame;

means for releasing said support leg;

control means for moving said wheel assembly vertically to cause said rearward end of said load surface to be lowered to thereby lower said depending means to the ground; and means for releasing said subframe from a pivotal connection with said load surface, said safety mechanism being operable to place said subframe on the ground, supported by said support leg and said depending means while supporting a receptacle in said lifting arms free from said load surface.

13. A transport vehicle according to claim 12, further including a protection cap mounted on said cross-beam for protecting said wheel assembly.

14. A transport vehicle according to claim 12, wherein said engagement means comprises a horizontally and transversely extending portion of said cross-beam, said portion extending forwardly and above said rearward end of the load surface in order to rest thereon, said portion being free to pivot upwardly above said rearward end of said load surface.

* * * * *